(12) United States Patent
Ichioka et al.

(10) Patent No.: US 7,362,924 B2
(45) Date of Patent: Apr. 22, 2008

(54) OPTICAL MODULATOR

(75) Inventors: Masayuki Ichioka, Tokyo (JP);
Katsutoshi Kondou, Tokyo (JP);
Yasuhiro Ishikawa, Tokyo (JP);
Takashi Shinriki, Tokyo (JP); Satoshi Oikawa, Tokyo (JP); Junichiro Ichikawa, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 240 days.

(21) Appl. No.: 11/389,726

(22) Filed: Mar. 27, 2006

(65) Prior Publication Data

US 2007/0053625 A1 Mar. 8, 2007

(30) Foreign Application Priority Data

Mar. 29, 2005 (JP) ............................. 2005-096447

(51) Int. Cl.
*G02F 1/035* (2006.01)
(52) U.S. Cl. ..................... 385/2; 385/1; 385/3; 385/14; 385/131
(58) Field of Classification Search .................... 385/1, 385/2, 3, 14, 15, 31, 39, 40, 42, 129, 130, 385/131
See application file for complete search history.

(56) References Cited

U.S. PATENT DOCUMENTS 5,408,566 A * 4/1995 Eda et al. .................... 385/131
2007/0053625 A1 * 3/2007 Ichioka et al. ................ 385/2
2007/0081755 A1 * 4/2007 Kondou et al. ............... 385/2
2008/0002926 A1 * 1/2008 Kondou et al. ............... 385/2

FOREIGN PATENT DOCUMENTS

| JP | 64-018121   | 1/1989  |
| JP | 06-289341   | 10/1994 |
| JP | 10-293223   | 11/1998 |
| JP | 11-052154   | 2/1999  |
| JP | 2003-215519 | 7/2003  |
| JP | 2004-046021 | 2/2004  |
| JP | 2004-093905 | 3/2004  |

* cited by examiner

*Primary Examiner*—Brian M. Healy
(74) *Attorney, Agent, or Firm*—Chapman and Cutler LLP

(57) ABSTRACT

An optical modulator using a thin plate capable of improving an S/N ratio of an output light is provided. The optical modulator including a thin plate 1 having an electrooptic effect and having a thickness of 20 μm or less, an optical waveguide 4 formed on a top or bottom surface of the thin plate, and a modulation electrode formed on the top surface of the thin plate to modulate light passing through the optical waveguide, wherein a stray light removing member 10 is disposed within the thin plate or in a vicinity of the thin plate.

14 Claims, 2 Drawing Sheets

(a)

(b)

(a)

(b)

OPTICAL MODULATOR

BACKGROUND OF THE INVENTION

1. Field of the Invention

The present invention relates to an optical modulator, and more particularly, to an optical modulator using a thin plate having an electrooptic effect.

2. Related Art Statement

In the related art, waveguide type optical modulators having optical waveguides or modulation electrodes formed on a substrate having an electrooptic effect have been widely used for optical communication fields or optical measurement fields.

Particularly, an amount of information transmission increases as multimedia technology is developed. Therefore, there is a need for a wide frequency band modulation technology in an optical modulator. In order to implement the wide frequency band modulation, various external modulation schemes with an LN (lithium niobate) modulator or the like are used. However, in order to implement the wide frequency band modulation with the LN modulator, there is a need for velocity matching between an optical wave and a microwave, that is, a modulation signal and decrease in driving voltage.

As one of means for solving the problem, a technique of satisfying the condition of velocity matching between the optical wave and the microwave and decrease in the driving voltage by using a thin substrate has been conventionally known.

In JPA_S64-18121 and JPA__2003-215519, an optical waveguide and an modulation electrode are disposed in a thin substrate (hereinafter, referred to as a first substrate) having a thickness of 30 µm or less, and after that, a substrate (hereinafter, referred to as a second substrate) having a dielectric constant lower than that of the first substrate is attached to the first substrate. By doing so, an effective refractive index with respect to a microwave is reduced, so that velocity matching between the microwave and an optical wave is obtained, and a mechanical strength of the substrate is maintained.

In JPA_S64-18121 and JPA__2003-215519, the first substrate is mainly made of LiNbO$_3$ (hereinafter, referred to as LN), and the second substrate is made of a material having a dielectric constant lower than that of the LN, such as quartz, glass, and aluminum oxide. In the combination of these materials, due to a difference between linear expansion coefficients thereof, temperature drift occurs according to change in temperature or DC drift occurs. Particularly, in JPA__2003-215519, in order to remove such defect, the first and second substrates are attached to each other by using an adhesive having a linear expansion coefficient close to that of the first substrate.

However, in a case where an optical modulator using an LN substrate fabricated in the related art is compared with an optical modulator using a thin LN substrate, as the thickness of the substrate is reduced, the light radiating or leaking from an optical waveguide or the light from an incident optical fiber to a region excluding the optical waveguide (hereinafter, referred to as stray light) has a tendency to be confined to the substrate. Because the LN substrate in the related art has a large thickness (for example, 500 µm to 1000 µm), there is a sufficient region in which the optical waveguide having a depth of, for example, several micrometers is not influenced. In addition, a spatial distribution density of the stray light (hereinafter, referred to as a stray light density) is lowered. As a result, the influence of the stray light is not serious. However, in a case where the thickness of the substrate is about the depth of the optical waveguide, the stray light density in the substrate increases. Therefore, the stray light propagates inside the substrate to enter into the optical waveguide again or an output optical fiber connected to the optical modulator. As a result, the S/N ratio of the output light deteriorates.

Moreover, in a case where a thin plate is used for the optical modulator, since a sufficient mechanical strength cannot be obtained by using the thin plate, there is a need to attach the second substrate, that is, a reinforcement plate to the first substrate, that is, the thin plate by using an adhesive or the like as described above. In this case, if the refractive index of the adhesive is lower than that of the thin plate, the confinement of the stray light is greatly dominated.

SUMMARY OF THE INVENTION

The present invention provides an optical modulator using a thin plate capable of improving an S/N ratio of an output light.

According to a first aspect of the invention, there is provided an optical modulator including a thin plate having an electrooptic effect and having a thickness of 20 µm or less, an optical waveguide formed on a top or bottom surface of the thin plate, and a modulation electrode formed on the top surface of the thin plate to modulate light passing through the optical waveguide, wherein a stray light removing member is disposed within the thin plate or in a vicinity of the thin plate.

According to a second aspect of the invention, there is provided an optical modulator according to the first aspect of the invention, wherein the stray light removing member is a light absorbing portion which is disposed on an outer surface of the thin plate excluding the optical waveguide and the vicinity thereof. In the present invention, an outer surface denotes top, bottom and side surfaces of the thin plate.

According to a third aspect of the invention, there is provided an optical modulator according to the second aspect of the present invention, wherein the light absorbing portion is formed in positions which are separated by 10 µm or more from the optical waveguide.

According to a fourth aspect of the invention, there is provided an optical modulator according to the first aspect of the present invention, wherein the stray light removing member is a high refractive index portion which is disposed on an outer surface of the thin plate in a portion of the optical waveguide or the vicinity thereof. In the present invention, a high refractive index denotes a refractive index which is substantially equal to or relatively higher than a refractive index of the thin plate.

According to a fifth aspect of the invention, there is provided an optical modulator according to the first aspect of the present invention, wherein the stray light removing member is a light guiding portion which is formed on a top or bottom surface of the thin plate excluding the optical waveguide.

According to a sixth aspect of the invention, there is provided an optical modulator according to the first aspect of the present invention, wherein the stray light removing member is a concave portion which is disposed on a top or bottom surface of the thin plate excluding the optical waveguide.

According to a seventh aspect of the invention, there is provided an optical modulator according to the sixth aspect of the present invention, wherein the concave portion is filled with a light absorbing material.

According to an eighth aspect of the invention, there is provided an optical modulator according to any one of the first to seventh aspects of the present invention, wherein a thickness of the thin plate is 10 μm or less.

According to the first aspect of the invention, in the optical modulator using a thin plate having a thickness of 20 μm or less, the stray light removing member is disposed within the thin plate or in a vicinity of the thin plate, so that the stray light propagating in the thin plate excluding the optical waveguide can be removed by the stray light removing member. Accordingly, it is possible to prevent the stray light from mixing into the output light of the optical modulator entering into an output optical fiber. In addition, it is possible to provide an optical modulator having an improved S/N ratio.

According to the second aspect of the invention, the light absorbing portion is disposed on the outer surface of the thin plate excluding the optical waveguide and the vicinity thereof as the stray light removing member, so that it is possible to effectively absorb and remove the stray light directing from the inner portion of the thin plate toward the outer surface of the thin plate without absorbing the optical wave propagating through the optical waveguide.

According to the third aspect of the invention, the light absorbing portion is formed in positions which are separated by 10 μm or more from the optical waveguide, so that it is possible to remove the stray light without absorbing the optical wave propagating through the optical waveguide. In addition, since the light absorbing portion is formed to surround the optical waveguide at the regions separated by a predetermined interval from the optical waveguide, the influence of the stray light which is not absorbed by the light absorbing portion is uniformly exerted over the optical waveguide, so that it is possible to suppress deterioration in characteristics in comparison to a case where the influence of the stray light is locally exerted.

According to the fourth aspect of the invention, the high refractive index portion is disposed on the outer surface of the thin plate in a portion of the optical waveguide or the vicinity thereof as the stray light removing member, so that it is possible to effectively extract the stray light directing from the inner portion of the thin plate toward the outer surface of the thin plate and remove the stray light from the thin plate.

According to the fifth aspect of the invention, the light guiding portion is formed on the top or bottom surface of the thin plate excluding the optical waveguide as the stray light removing member, so that it is possible to extract the stray light propagating inside the thin plate in a predetermined direction and to prevent the stray light from spreading and broadening into the thin plate. In addition, in order to absorb the stray light extracted in the predetermined direction by the light absorbing portion, the light absorbing portion may be disposed at an end of the light guiding portion.

According to the sixth aspect of the invention, the concave portion is formed on the top or bottom surface of the thin plate excluding the optical waveguide as the stray light removing member, and the concave portion is formed to have a shape of a groove or the like, so that it is possible to easily form the stray light removing member. In addition, it is possible to extract the stray light from the thin plate by using the concave portion or to reflect the stray light so as not to enter into the optical waveguide or the output optical fiber.

According to the seventh aspect of the invention, since the concave portion is filled with a light absorbing material, the stray light entering into the concave portion is absorbed, so that it is possible to prevent the stray light from spreading into the thin plate.

According to the eighth aspect of the invention, since the thickness of the thin plate is equal to or less than 10 μm, the stray light has a tendency to be confined to the thin plate. According to the present invention, it is possible to effectively remove the stray light.

BRIEF DESCRIPTION OF THE DRAWINGS

The invention will be described with reference to the accompanying drawings, wherein like numbers reference like elements, and wherein.

DESCRIPTION OF THE EMBODIMENTS

Now, preferred embodiments of the present invention will be described in detail.

Figure 1:
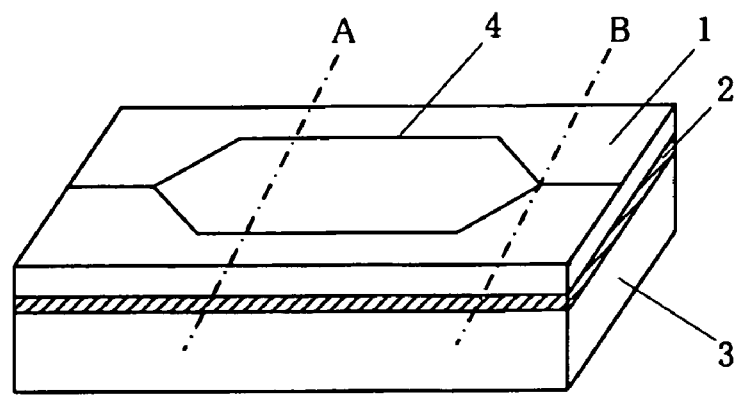
FIG. 1 is a perspective view of an optical modulator according to the present invention.

FIG. 1 is a perspective view of an optical modulator having a thin plate according to the present invention. An optical waveguide 4, a modulation electrode (not shown) such as a signal electrode and a ground electrode, or the like are disposed on a thin plate 1 made of a material having an electrooptic effect, and a reinforcement plate 3 is attached to the thin plate 1 with an adhesive 2 or the like. Alternatively, the optical waveguide may be formed on a bottom surface of the thin plate.

The optical waveguide may be formed by diffusing Ti or the like on the surface of the thin plate by using a thermal diffusion method or a proton exchange method. In addition, as disclosed in JPA H6-289341, a ridge may be formed on the surface of the thin plate 1 corresponding to a shape of an optical waveguide to constitute the optical waveguide.

The modulation electrode such as a signal electrode and a ground electrode may be formed by using a Ti/Au electrode pattern formation method, a gold plating method, or the like. In addition, as needed, a buffer layer (not shown) made of a dielectric material of $SiO_2$ may be formed on the surface of the thin plate where the optical waveguide is formed, and after that, the modulation electrode may be formed on the buffer layer.

The material having an electrooptic effect may include, for example, lithium niobate, lithium tantalite, PLZT (lead lanthanum zirconate titanate), a quartz-based material, and a combination thereof. In particular, a lithium niobate (LN) crystal which has a good electrooptic effect may be suitably used.

In the formation of the thin plate 1 having an optical modulation device, the aforementioned optical waveguide is formed on a substrate having a thickness of several hundreds of micrometers, and a surface of the substrate on which the optical waveguide is not formed is polished to form the thin plate having a thickness of 20 μm or less. After that, the modulation electrode is formed on the surface of the thin plate. In addition, after the formation of the optical waveguide or the modulation electrode, a surface of the substrate on which the optical waveguide is not formed may be polished. If a thermal shock or a mechanical shock is exerted on the thin plate during the formation of the optical waveguide or during the various processes, the thin plate may be damaged. Therefore, it is preferable that such processes for exerting the thermal shock or the mechanical shock is performed before the process of polishing the substrate into the thin plate.

Various materials may be used for the reinforcement plate 3. For example, the same material as the thin plate may be used. In addition, a material such as quartz, glass, and aluminum oxide having a lower dielectric constant than that of the thin plate may be used. Alternatively, such material disclosed in JPA H6-289341 having a different crystal orientation from that of the thin plate may be used. Here, it is preferable that a material having the same linear expansion coefficient of the thin plate is used in order to stabilize a modulation characteristic of the optical modulator against change in temperature. Alternatively, if it is difficult to use the material having the same linear expansion coefficient of the thin plate, an adhesive (for attaching the thin plate and the reinforcement plate) having the same linear expansion coefficient of the thin plate may be used as disclosed in JPA__2003-215519.

The thin plate 1 and the reinforcement plate 3 may be attached by using various adhesive materials such as an epoxy-based adhesive, a thermosetting adhesive, a UV-curable adhesive, a solder glass, a thermosetting resin adhesive sheet, a photocuring resin adhesive sheet, or an phototackifier resin adhesive sheet as an adhesive layer 2.

In the optical modulator shown in FIG. 1, stray light is generated from an optical branching unit or a multiplexing unit of the optical waveguide, or a connection portion of an incident optical fiber (not shown), and the optical modulator within the thin plate excluding the optical waveguide. In a case where a thickness of the thin plate is small, particularly, a case where the thickness is 20 μm or less, the stray light propagates through the thin plate to enter into the optical waveguide or an output optical fiber. The inventor discovers the problem and achieves the present invention.

According to the present invention, in order to solve the problem, there is provided an optical modulator having a thin plate having an electrooptic effect, an optical waveguide formed on a top or bottom surface of the thin plate, and a modulation electrode formed on the top surface of the thin plate to modulate light passing through the optical waveguide, wherein a stray light removing member is disposed within the thin plate or in a vicinity of the thin plate.

Various members may be used as the stray light removing member in the present invention. Particularly, a light absorbing portion, a high refractive index portion, a light guiding portion, or a concave portion such as a groove may be suitably used as the stray light removing member.

Figure 2:
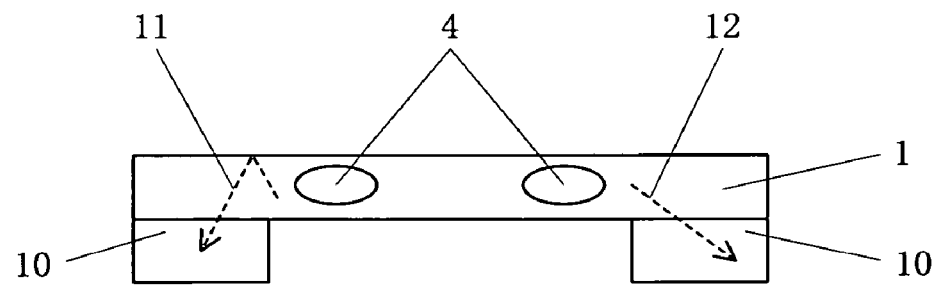
FIG. 2 is a partial cross sectional view showing an optical modulator having an light absorbing portion as a stray light removing member.
Figure 2:
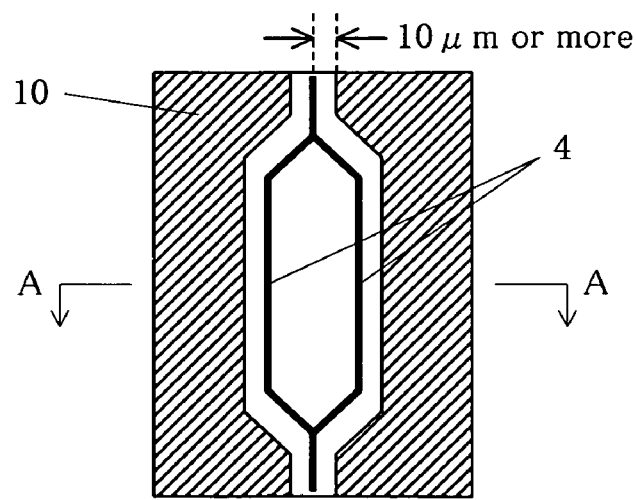

FIG. 2A is a cross sectional view of the optical modulator taken along one dotted line A of FIG. 1. FIG. 2A shows an example of using the light absorbing portion as the stray light removing member. For the convenience of description, a modulation electrode, an adhesive layer, and a reinforcement plate are omitted.

In order to allow the light absorbing portion 10 not to absorb the optical wave propagating through the optical waveguide 4 formed on the thin plate 1 such as a branch optical waveguide, the light absorbing portion is disposed to be attached on an outer surface such as a bottom surface (see FIG. 2A) or a top surface of the thin plate excluding the optical waveguide 4 or the vicinity thereof. The thin plate 1 and the light absorbing portion may be disposed by a coating method such as deposition, sputtering and applying methods, or the light absorbing portion may be attached to the thin plate with an adhesive or the like, or otherwise, only contacted on the thin plate.

As a material for the light absorbing portion, a metal having a high light absorption coefficient such as Al, Ti, Ta, Fe, Y, and La is suitably used.

As shown in FIG. 2A, the light absorbing portion 10 is disposed on the thin plate 1, so that stray lights 11 and 12 propagating inside the thin plate 1 can be efficiently absorbed.

In addition, as shown in an example of FIG. 2B, the light absorbing portion 10 is formed on the bottom surface of the thin plate at positions separated by 10 μm or more from the optical waveguide 4. In addition, the light absorbing portion is formed to surround the optical waveguide or to be symmetrical with respect to the optical waveguide. As a result, the influence of the stray light which is not absorbed by the light absorbing portion is uniformly distributed over the optical waveguide, so that it is possible to prevent deterioration in the characteristics in comparison to a case where the influence of the stray light is locally exerted.

In addition, FIG. 2A is a cross sectional view taken along line A-A of FIG. 2B.

Figure 3:
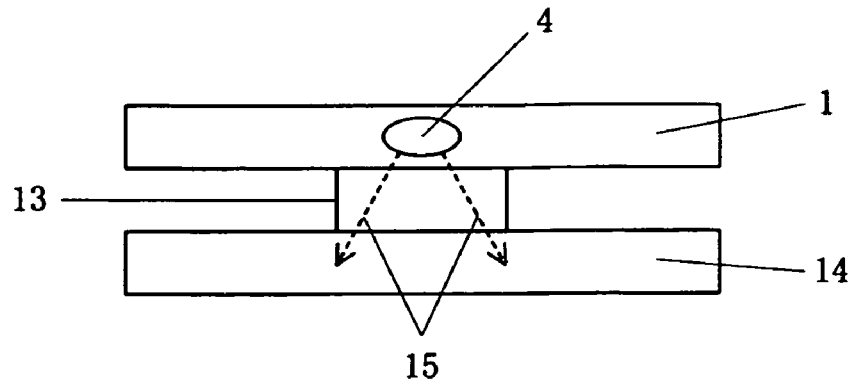
FIG. 3 is a partial cross sectional view showing an optical modulator having a high refractive index portion as a stray light removing member.

As another embodiment, as shown in FIG. 3, a high refractive index portion 13 may be disposed on the thin plate 1 in order to remove the stray light.

FIG. 3 is a cross sectional view taken along one dotted line B passing through the multiplexing unit of the optical waveguide 4 shown in FIG. 1.

In the multiplexing unit of the optical waveguide, an optical wave propagating through the branch optical waveguide is interfered, and a radiation light is emitted outside the optical waveguide 4. Since the radiation light propagates inside the thin plate as the stray light, the high refractive index portion 13 is disposed on the outer surface of the thin plate at regions where the optical waveguide is formed or the vicinities thereof. As a result, the radiation light 15 is extracted outwardly from the thin plate. In addition, the radiation light is induced to another member 14 such as the reinforcement plate disposed under the high refractive index portion 13.

As a material for the high refractive index portion, a material for the thin plate or a high refractive index material having a higher refractive index than the thin plate such as LN, lithium tantalite, PLZT, $Ta_2O_5$, and $Nb_2O_5$ may be suitably used.

In addition, the position where the high refractive index portion is formed is not limited to those of FIG. 3, but the position of FIG. 2A may be used. In addition, as the method of forming the high refractive index portion on the thin plate, various methods may be used similar to the above-described light absorbing portion.

In addition, as a material for the member 14, it is preferable that a material having a higher refractive index than the high refractive index portion 13 or a material having a light absorbing property is selected in order to allow the optical wave 15 induced into the high refractive index portion 13 not to return to the thin plate 1.

Figure 4:
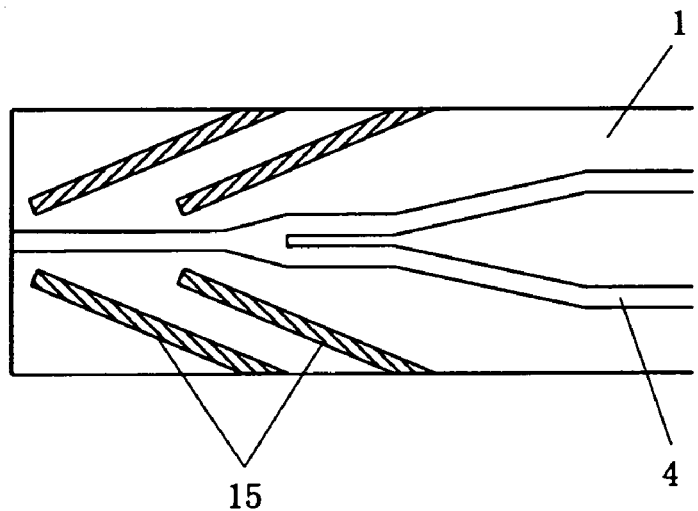
FIG. 4 is a view showing an optical modulator having an light guiding portion as a stray light removing member.

FIG. 4 shows an embodiment using the light guiding portion 15 as the stray light removing member. The light guiding portion 15 which can guide the optical wave is formed in the vicinity of the optical waveguide 4 formed on the thin plate 1. In a state that the optical waveguide and an incident optical fiber (not shown) are optically coupled, an optical wave enters from the optical fiber to the waveguide 4. Since the optical wave not entering into the optical waveguide and entering into the thin plate becomes the stray light, the light guiding portion 15 collects the stray light and guides the stray light in a predetermined direction, so that it is possible to remove the stray light.

In addition, in a case where a plurality of the light guiding portions are formed at both sides or one side of the optical waveguide, the formation angles of the light guiding portions are adjusted to implement various absorbing angles of the stray light, so that it is possible to increase absorbance of the stray light.

As a method of forming the light guiding portion 15, the light guiding portion may be formed by thermally diffusing Ti or the like similar to the optical waveguide. In a case where the light guiding portion is made of the same material as the optical waveguide, when the optical waveguide is formed on the thin plate, the light guiding portion can be also formed. As a result, the production process of the optical modulator is not complicated.

The light guiding portion 15 may be formed at positions where the leakage light from the end of the incident optical fiber can be collected as shown in FIG. 4, or at positions in the vicinity of the branching unit or the multiplexing unit of the optical waveguide where the stray light can be easily generated. In addition, the light guiding portion 15 has wave propagation characteristics similar to those of the optical waveguide 4. If the two components are too close to each other, optical interaction therebetween occurs, so that the optical wave propagating through the optical waveguide may be influenced. Therefore, it is preferable that the distance therebetween is selected not to generate the optical interaction.

In addition, in FIG. 4, the optical wave guided by the light guiding portion 15 is designed to be emitted from the optical modulator outwardly. However, as needed, the light absorbing portion may be disposed at the end of the light guiding portion (or in the light guiding portion), so that the optical wave guided by the light guiding portion can be absorbed. For example, a method of guiding the optical wave into a lower portion of a metal electrode, and absorbing the light wave, is effective. In addition, the light guiding portion may be formed on the bottom surface of the thin plate as well as the top surface of the thin plate.

Figure 5:
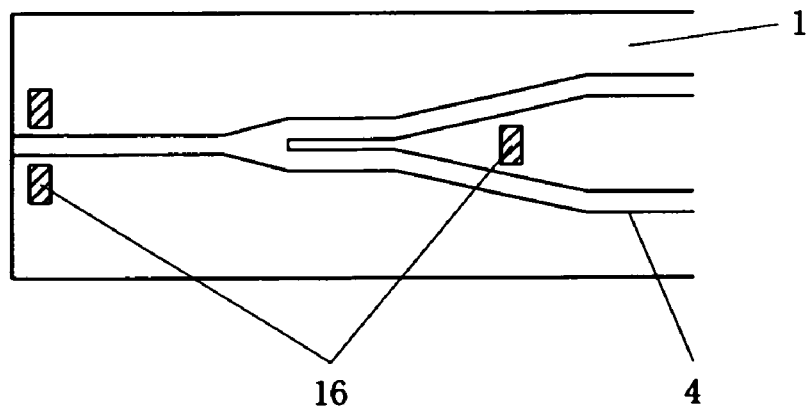
FIG. 5 is a view showing an optical modulator having a concave portion as a stray light removing member.

FIG. 5 shows an example using the concave portion 16 formed on a top surface of the thin plate 1 as the stray light removing member.

The concave portion 16 may be formed on the top or bottom surface of the thin plate by using a mechanical process such as laser ablation and sandblast or a chemical process such as etching.

The stray light entering into the concave portion 16 is emitted from the thin plate or reflected from walls of the concave portion. Therefore, the concave portion is disposed at a position where the stray light is easily generated, or where the stray light easily enters. Moreover, the concave portion is disposed at a region in the vicinity of the connection portion between an output optical fiber and the optical modulator. By doing so, it is possible to suppress the influence of the stray light on the S/N ratio of the output light of the optical modulator.

In addition, the concave portion 16 is filled with a light absorbing material, so that it is possible to prevent the stray light entering into the concave portion from returning to the thin plate.

EXAMPLES

Now, examples of the optical modulator according to the present invention and test thereof will be described.

In order to fabricate a thin-plate optical modulation device, an X-cut LN substrate having a thickness of 500 μm is used. As shown in FIG. 1, a Mach-Zehnder type optical waveguide is formed on a top surface of the substrate by using a Ti diffusion process or the like.

A thermo-plastic resin is coated on the top surface of the substrate, and a dummy substrate for polishing is attached. A bottom surface of the substrate is polished with a polishing machine to allow a thickness thereof to be 20 μm, and after that, a modulation electrode having a height of 14 μm is formed by using a plating process, so that a thin plate where the optical modulation device is formed is completed.

First Example

In a first example, in the bottom surface of the thin plate fabricated by the above-described method, an Al film is formed as a light absorbing member on all the regions which are separated by 10 μm from a region in which the optical waveguide is formed as shown in FIG. 2B. After that, an optical path coupling UV-curable adhesive which has a function of propagating an optical wave in a communication wavelength range is coated, and a substrate made of the same material as the thin plate is attached as a reinforcement plate on the bottom surface of the thin plate.

Second Example

In a second example, in the bottom surface of the LN thin plate fabricated by the above-described method, a high refractive index portion having a height of 60 μm is disposed in a region where a multiplexing unit of the branch optical waveguide is formed as shown in FIG. 3. The optical path coupling UV-curable adhesive is coated, and a reinforcement plate is attached on the bottom surface of the high refractive index portion. Preferably, the refractive index of the high refractive index portion or the reinforcement plate is equal to or larger than that of the thin plate. In the second example, the high refractive index portion and the reinforcement plate are made of LN which is the same material for the thin plate.

Third Example

When the thin plate is fabricated by the aforementioned method, the light guiding portion 15 is formed by diffusing Ti as shown in FIG. 4. The closest distance between the light guiding portion and the optical waveguide is about 10 μm, and the light guiding portion is formed to be slanted at an angle of 0.5° to 1.5° with respect to a central axis of the optical waveguide 4.

In a case where a plurality of the light guiding portions are formed, it is more preferable that the angles of light guiding portions with respect to the central axis are different from each other. The optical path coupling UV-curable adhesive is applied on the thin plate where the optical modulation device is formed, and a substrate made of the same material as the thin plate is attached as the reinforcement plate on the bottom surface of the thin plate.

Fourth Example

When the thin plate is fabricated by the aforementioned method, the concave portion having a dimension of 20 μm×25 μm×30 μm (depth×width×length) is formed in a region shown in FIG. 5 by sandblast after the formation of the optical waveguide. The optical path coupling UV-curable adhesive is applied on the thin plate where the optical modulation device is formed, and a substrate made of the same material as the thin plate is attached as the reinforcement plate on the bottom surface of the thin plate.

Fifth to Eighth Examples

Unlike the first to fourth examples where the thickness of the thin plate is 20 μm, in the fifth to eighth examples, the substrate is formed to have a smaller thickness of about 10 μm so as to implement velocity matching between a microwave and an optical wave or to obtain a low driving voltage. Other processes for fabricating the thin plate are the same as the processes of the first to fourth examples.

Comparative Example

When the thin plate having a thickness of 20 μm is fabricated by the aforementioned method, the above-described adhesive is applied on the thin plate where the optical modulation device is formed, and a substrate made of the same material as the thin plate is attached as the reinforcement plate on the bottom surface of the thin plate.

Test Method

The optical modulators of the first to eighth examples and the comparative example are connected to optical fibers. Next, text light enters into the incident optical fiber, and the output light from the output optical fiber is measured with a power meter to test the S/N ratios of the output light from the optical modulators.

The result of the measurement is shown in Table 1. Here, a denotes a standard deviation.

TABLE 1

|  | Extinction Ratio (dB) | σ (n = 5) |
|---|---|---|
| First Example | 22.8 | 5.5 |
| Second Example | 21.1 | 5.8 |
| Third Example | 25.7 | 3.3 |
| Fourth Example | 28.4 | 4.9 |
| Fifth Example | 23.3 | 4.4 |
| Sixth Example | 26.6 | 5.3 |
| Seventh Example | 25.8 | 3.5 |
| Eighth Example | 29.9 | 3.8 |
| Comparative Example | 20.5 | 5.9 |

As seen from Table 1, it can be understood that the S/N ratios of the output light of the first to eighth examples can be further improved in comparison to the S/N ratio of the comparative example.

As described above, according to the present invention, it is possible to provide an optical modulator using a thin plate having a thickness of 20 μm or less capable of improving an S/N ratio of an output light.

What is claimed is:

1. An optical modulator comprising
   a thin plate having an electrooptic effect and having a thickness of 20 μm or less,
   an optical waveguide formed on a top or bottom surface of the thin plate, and
   a modulation electrode formed on the top surface of the thin plate to modulate light passing through the optical waveguide,
   wherein a stray light removing member is disposed within the thin plate or in a vicinity of the thin plate.

2. The optical modulator according to claim 1, wherein the stray light removing member is a light absorbing portion which is disposed on an outer surface of the thin plate excluding the optical waveguide and the vicinity thereof.

3. The optical modulator according to claim 2, wherein the light absorbing portion is formed in positions which are separated by 10 μm or more from the optical waveguide.

4. The optical modulator according to claim 1, wherein the stray light removing member is a high refractive index portion which is disposed on an outer surface of the thin plate in a portion of the optical waveguide or the vicinity thereof.

5. The optical modulator according to claim 1, wherein the stray light removing member is a light guiding portion which is formed on a top or bottom surface of the thin plate excluding the optical waveguide.

6. The optical modulator according to claim 1, wherein the stray light removing member is a concave portion which is formed on a top or bottom surface of the thin plate excluding the optical waveguide.

7. The optical modulator according to claim 6, wherein the concave portion is filled with a light absorbing material.

8. The optical modulator according to claim 1, wherein a thickness of the thin plate is 10 μm or less.

9. The optical modulator according to claim 2, wherein a thickness of the thin plate is 10 μm or less.

10. The optical modulator according to claim 3, wherein a thickness of the thin plate is 10 μm or less.

11. The optical modulator according to claim 4, wherein a thickness of the thin plate is 10 μm or less.

12. The optical modulator according to claim 5, wherein a thickness of the thin plate is 10 μm or less.

13. The optical modulator according to claim 6, wherein a thickness of the thin plate is 10 μm or less.

14. The optical modulator according to claim 7, wherein a thickness of the thin plate is 10 μm or less.

* * * * *